Figure 1:
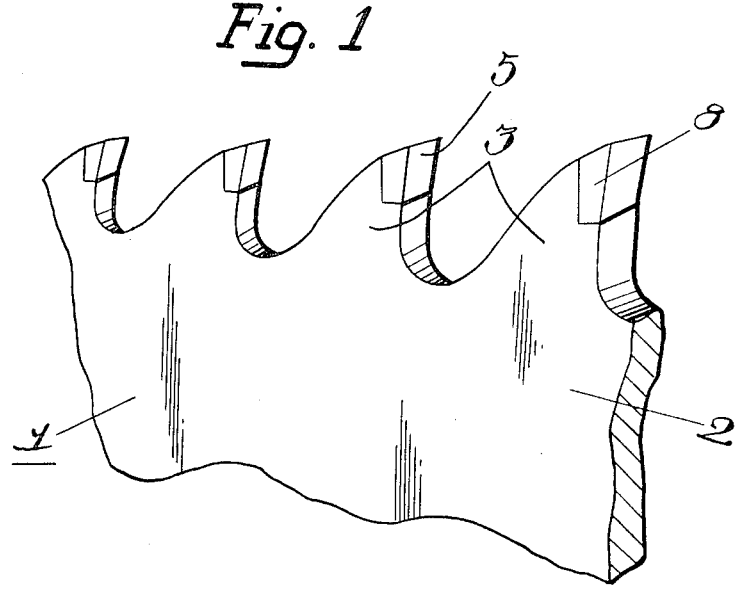

United States Patent [19]
Funakubo

[11] 3,736,828
[45] June 5, 1973

[54] A BIMETALLIC HIGH-SPEED CUTTING BLADE
[75] Inventor: Toshiei Funakubo, Odawara-shi, Kanagawa-ken, Japan
[73] Assignee: Kabushiki-Kaisha Eishin, Tokyo, Japan
[22] Filed: Jan. 15, 1971
[21] Appl. No.: 106,681

[30] Foreign Application Priority Data
Dec. 5, 1970  Japan ............................. 45/107780

[52] U.S. Cl. ................... 83/661, 83/674, 76/101 A
[51] Int. Cl. ............................................. B26d 1/46
[58] Field of Search ...................... 83/661, 694, 674; 143/133 B; 76/101 A

[56] References Cited
UNITED STATES PATENTS

| | | | |
|---|---|---|---|
| 2,528,226 | 10/1950 | Hildebrant | 143/133 B |
| 1,956,233 | 4/1934 | Braun | 76/101 A X |
| 3,507,633 | 4/1970 | Dewey | 143/133 B X |
| 2,671,947 | 3/1954 | Linde | 143/133 B |
| 3,176,732 | 4/1965 | Henderson | 143/133 B |
| 2,965,143 | 12/1960 | Feldmann | 143/133 B |
| 3,162,928 | 12/1964 | Kruse | 76/101 A |

OTHER PUBLICATIONS

"Metals & Alloys" May 1936

Primary Examiner—Andrew R. Juhasz
Assistant Examiner—Leon Gilden
Attorney—Shlesinger, Fitzsimmons & Shlesinger

[57] ABSTRACT

A bimetallic high-speed cutting blade having a series of teeth provided to one of longitudinal edges thereof with a desired space therebetween, the body of each teeth being provided at its forward top end a cut-out portion on which a tip of super-hard materials molded before finally being sintered into a shape substantially equal to a desired final configuration which can act as cutting edge having sharp square corners is welded to brazed so that the machining work of said tip to said desired final configuration after it has been welded or brazed to the tooth body shall be minimized, and the super-hard materials constituting said tip being selected from those having such hardness and flexural strength which shall not be affected by the heat to be applied thereto when the tip is welded or brazed firmly onto the tooth body.

2 Claims, 3 Drawing Figures

INVENTOR.
TOSHIEI FUNAKUBO
BY
ATTORNEYS

BIMETALLIC HIGH-SPEED CUTTING BLADE

This invention relates to a novel bimetallic high-speed cutting blade, structures of which are based upon new knowledge, and a method of producing said blade.

More particularly, it relates to a bimetallic high-speed cutting blade, which comprises a base of blade made of a coil of the flexible back-forming strip material or band and provided at one of its longitudinal edges with a series of teeth which are spaced each other with a desired distance therebetween, the main body of each teeth having at its forward top end a cut-out portion having a substantially L shape when viewed transversely to the plane of blade, upon which a cutting tip of a substantially square pillar is welded or brazed by its backward and bottom surfaces, and which is characterized in that said cutting tip is made from super-hard materials selected from alloys predominantly containing tungsten carbides, alloys of multi-carbides containing in their major portions tungsten carbides and in their minor portions titanium and/or tantalum carbides, alloys of carbides predominantly containing tantalum and/or vanadium carbides, ceramics predominantly containing aluminum oxides or silicon dioxides by means of forming their powdery constituents into a configuration substantially equal to that of cutting tip welded or brazed to the cut-out portion of main body of tooth and subsequently machined so as to act as a sharp cutting edge in advance of finally sintering or molding those molded or melted powdery constituents, and also in that the aforementioned super-hard materials are selected from those provided with such hardness and flexural strength which can sufficiently stand against a temperature by which a welding or brazing medium can be melted to form such a firm binding surface which lies between the tip and tooth body and can stand well against the heat to be produced with the cutting operation of the blade at a high speed, and further in that the substantially square cutting tip is afforded with such dimensions slightly larger than the width of blade so that the tip bound to the tooth body shall be machined mainly at the sides parallel to the base of blade for obtaining the desired configuration which can act as sharp cutting tip.

This invention relates also to a method of producing a bimetallic high-speed cutting blade of the kind mentioned above, which comprises forming a series of teeth with a desired space therebetween along one of longitudinal edges of a base of blade made of a coil of the flexible back-forming strip material or band, providing a cut-out portion having a L shaped configuration when viewed transversely to the plane of blade to the main body of each teeth, welding or brazing to the cut-out portion at its backward and bottom surfaces a substantially square cutting tip made from super-hard materials selected from alloys predominantly containing tungsten carbides, alloys of multi-carbides containing in their major portions tungsten carbides and in their minor portions titanium and/or tantalum carbides, alloys of carbides predominantly containing tantalum and/or vanadium carbides, ceramics predominantly containing aluminum oxides or silicon dioxides, said tip being formed to the desired configuration which substantially corresponds to and comes to, through a minor machining operation after having been welded or brazed to the tooth body, such a shape which can act as sharp cutting edge, in advance of finally sintering or molding molded or melted powdery constituents which form the super-hard materials, and machining slightly the tip welded or brazed to the tooth body at sides thereof which run in parallel to the plane of base of blade, and the super-hard materials which form the sharp cutting tip having Vikers hardness about 1,300 Hv. to 1,550 Hv. and flexural strength of about 210 Kg./mm$^2$ to 160 Kg./mm$^2$ so that the super-hardness proper to the materials shall not adversely be affected by the temperature by which a welding or brazing medium can be melted to form a binding surface which lies between the tip and tooth body and has Vikers hardness of about 450 Hv. to 500 Hv.

Though a considerable number of experiments have been conducted and a number of new methods have been developed for affording edges of teeth of a cutting blade including a band saw blade with high heat-resistance and abrasion-resistance and consequently for giving the saw blade prolonged cutting efficiencies. The saw blade made in accordance with the present invention is, however, based on an entirely new knowledge as mentioned above, and entirely different from those disclosed in the prior arts.

As one of the prior arts related with armouring cutting edges of saw blades, U.S. Pat. No. 3,104,562 discloses a method for armouring edges of cutting teeth of a saw blade, in which a spherical tip made from a super-hard alloy such as tungsten carbide is insertedly fitted into a circular crater formed at the edge of each cutting teeth and brazed thereto, whereas it seems that this method is almost impracticable in carrying it on an industrial basis, because it requires extremely elaborate technics and equipments to produce such tips of small dimensions by means of molding and sintering powdery constituents of the super hard alloy, and moreover, it is nearly impossible to economically finishing the tip brazed to the edge of cutting teeth to a desired configuration.

As a prior art disclosing another method of the manufacture of a high-speed cutting band saw blade, in which cutting teeth are formed after armouring a carbon steel backing band, U.S. Pat. No. 3,315,548 might be notified. Said patent teaches a method of manufacturing an armoured high-speed cutting saw blade, which in brief comprises a step of welding a wire of high-speed cutting tool steel to one edge of a carbon steel backing band and a step of cutting said bimetallic edge to form along said edge teeth of the desired size and shape. This method is, however, accompanied with such drawbacks that only the tips of the teeth are formed of high-speed cutting tool steel and the remaining greater part of said tool steel welded to the edge is cut off from the blade, whereby the loss of expensive tool steel becomes inevitably great.

Reasons why such methods which are accompanied with a comparatively poor productivity are to be employed, are due to the fact that it is extremely difficult to mold and sinter powdery constituents of super-hard alloy materials into a tip of extremely small dimensions which correspond to the final configuration of tip which can act as cutting edges with little machining operation, and that the internal structures of tip made from super-hard alloy are adversely affected by the welding or brazing heat, resulting in dropping hardness and flexural strength thereof to such an extent that the tip can hardly stand against the high-speed cutting operation, and further that the lowering of welding or brazing temperature so as to avoid the deterioration of hardness and flexural strength of tip, on the other hand, inevitably brings about the lowering of hardness about welding or brazing portions to be formed between the tip and tooth body, resulting in making said portions not strong enough to stand against the high-speed cutting operation. In order to obtain a super-hard alloy tip having a desired configuration and sharp corners, it has been tried by the present inventor to cut, to a desired size, a material made by molding and sintering powdery constituents of super-hard alloy such as tungsten carbides into a strip form having a thickness corresponding to that of a saw blade, but such trial has ended in failure, because upon cutting the super-hard alloy of a strip form into pieces, the sharp corners of alloy were destroyed and it was nearly impossible to obtain, through such cutting operation, tips of alloys provided with sharp edges which can act as sharp cutting corners as they are when welded or brazed to tooth body. It shall be noted, therefore, that one of features of the present invention lies in that in order to obtain tips of super-hard materials having shapes or configurations substantially equal to those which can act as sharp cutting edges as they are when welded or brazed to cut-out portions of teeth body of blade, powdery constituents of super-hard alloys which are preliminarily molded, are formed into the aforementioned shapes or configurations, by means of cutting and the like operation in advance of finally sintering them, and are sintered after the formation of preliminarily molded powdery constituents into tips of a desired size. It shall be noted also, as another noticeable feature of the present invention, that the tips having comparatively small dimensions thus obtained are selected and made from such super-hard materials, hardness and flexural strength of which shall not be affected by the heat to be applied thereto when the tips are welded or brazed onto the teeth bodies.

It is, therefore, an object of the present invention to provide a bimetallic high-speed cutting blade having a series of teeth provided to one of longitudinal edges thereof with a desired distance therebetween, the body of each teeth being provided at its forward top end a cut-out portion on which a tip of super-hard materials molded and sintered to a shape substantially equal to a desired final configuration which can act as cutting corners is welded or brazed so that the machining work of said tip to said desired final configuration after having been welded or brazed to the tooth body shall be minimized, and the super-hard materials constituting said tip being selected from those having such hardness and flexural strength which shall not be affected by the heat to be applied thereto with the welding or brazing of tip to the tooth body.

It is another object of the present invention to provide a method of making a bimetallic high-speed cutting blade of the kind mentioned above.

Figure 2:
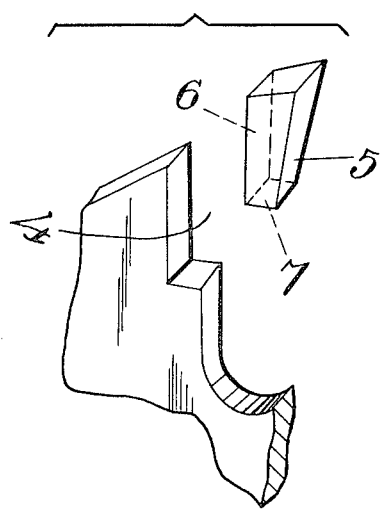
Figure 3:
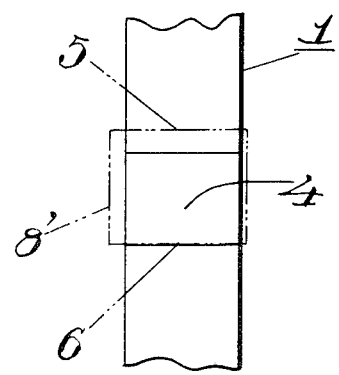

In the accompanying drawing in which a preferred embodiment of the present invention is illustrated;

FIG. 1 is a perspective view of a part of the present invention blade in the form of a band saw blade, FIG. 2 is a perspective view on an enlarged scale showing a tooth body having a cut-out portion formed therein and with a tip of substantially square pillar in a separated position relatively thereto, and FIG. 3 is an explanatory plan view showing the clearance between the cut-out portion formed in a tooth body and a tip when the latter is mounted on the former for welding or brazing.

Now, referring to the drawing, to a cut-out portion 4 having a substantially L shape when viewed transversely to the plane of base plate 2 of saw blade 1, which is formed in a forward top end of each teeth trained in series with a desired distance therebetween, a cutting tip 5 made from super-hard materials such as tungsten carbides in the form of a substantially square pillar is provided. Said tip 5 has a backward surface 6 and bottom surface 7, by which it is welded or brazed to the cut-out portion, and is provided with such a configuration or dimensions substantially equal to those said tip shall come to have after it is welded or brazed onto the cut-out portion and slightly machined along its sides. In other words, said tip is primarily provided with such configuration which can act as sharp cutting edges only with little machining. A tip made from super-hard materials and provided with sharp corners is obtained, in the present invention, by shaping powdery constituents of materials into the desired configuration before finally sintering it. In the concrete, such tips have been obtained, for example, by means of a cold press sintering method, in which powdery constituents of alloys mixed at a specific ratio are preliminarily sintered being pressed, cut into a desired configuration, and finally sintered.

Though the cutting tip 5 should preferably be provided with dimensions which exactly correspond to those which can act as cutting edges as it is when welded or brazed to the blade, it is afforded, in practice as shown in FIG. 3, with a clearance 8' which extends transversely to the plane of blade and has the length corresponding to about two tenth of the whole width, because the tip can hardly be located exactly onto the cut-out portion at its side which extends transversely to the plane of blade and are not to be supported by any surfaces of cut-out portion. It has been found through experiments that a welding or brazing medium which forms a binding surface between the tip 5 and cut-out portion 4 has to be provided with Vickers hardness of about 450 to 500 Hv. so that it can prevent the tip and cut-out portion from separating from each other at the high-speed cutting operation and also can ensure the flexibility of the blade 1 as a whole. In order to afford the welded or brazed portion with the aforementioned hardness, it has been found also that the welding or brazing medium should be those which shall be solidified after heating it to a temperature of about 1,300°C, and also found that super-hard materials, structures of which shall not be affected by such temperature should have Vickers hardness of about 1,300 to 1,550 Hv. and its flexural strength of about 210 Kg./mm² to 160 Kg./mm².

In order to assist the better understanding of the present invention blade, some preferred embodiments thereof in case of particularly manufacturing a band saw blade in accordance with the present invention are described hereinunder.

Example 1

To a backing blade 2 of a strip of carbon tool steel of SK 6 containing about 0.8 percent of carbon and having a thickness of 1.05mm and width of 32mm, there is provided along one of its longitudinal edges a series of teeth each having at the forward top end of its base a cut-out portion 4 ( having (1) a bottom surface of the length of 1.05 mm at its side extending transversely to the plane of blade, (2) the bottom surface of the length of about 0.8 mm at the side parallel to the longitudinal direction of blade, and (3) a backward surface having the height of about 1.5 mm). A tip made from an alloy of tungsten carbides ( containing 79% of W, 6% of AiC and TaC and 15% of Co ) having Vickers hardness of about 1,300 Hv. and flexural strength of about 210 Kg/mm² was brazed onto the aforementioned cut-out portion by means of firstly applying on the backward and bottom surfaces of cut-out portion a brazing medium predominantly containing nickel which was mixed with powdery flux and heated up to about 880°C, and subsequently mounting the tip onto the cut-out portion and heating up to about 1,300°C. Said tip was provided with a bottom surface 7 of 1.3 mm at its side transverse to the plane of blade and of 0.8 mm at its side parallel to the plane of blade, a backward surface having the height of 1.5 mm and a top surface of 1.0 mm at its side parallel to the plane of blade. The clearance 8' of about 0.25 mm provided to the tip at its side extending transversely to the plane of blade was machined after it has been brazed to the cut-out portion. The Vickers hardness of brazed portion was measured as about 450 to 500 Hv. It was confirmed through experimental cutting operation that the hardness and flexural strength of tips were not affected by the aforementioned brazing temperature and the brazed portion was sufficiently strong enough to stand against the cutting operation. The experimental cutting operation conducted with the band saw blade obtained as described in the above was such that the blade mounted on a band sawing machine was rotated at the speed of 96 m/sec. and directed to cut a steel material of S45C having the diameter of 200 mm. The cutting depth of each teeth into the material was about 0.2 mm and the material was cut out at about 140 seconds.

Example 2

A band saw blade having the structures and constructions same to those described in the foregoing Example 1 but provided with tips made from an alloy steel containing 82% of W, 10% of TaC and AiC and 8% of Co and having Vickers hardness of about 1,550 Kg/mm² has also shown extremely good cutting efficiency.

I claim:
1. A bimetallic high-speed cutting blade having
   a base of flexible material,
   a series of teeth on one of the longitudinal edges of said base, which are longitudinally spaced from one another, the main body of each tooth having at its top forward end a stepped cut-out portion which is of approximately L-shape when viewed in the plane of the blade, the bottom and back of each cut-out portion being planar, and the back of each cut-out portion being inclined slightly rearwardly of the cutting direction of the blade from bottom to top, and
   a cutting tip secured directly on the cut-out portion of each tooth, each tip being of generally inverted truncated wedge shape and having plane back and bottom surfaces to seat on the corresponding surfaces of a cut-out portion of a tooth, each cutting tip having front, rear, top and bottom faces which are rectangular and side faces which are trapezoidal in shape, each tip being a sintered superhard alloy molded to shape and having hardness and flexural strength sufficient to withstand the temperature required to weld or braze the tip onto the cut-out portion of a tooth, the width of each tip being greater than the width of the cut-out portion on which the tip is seated.
2. A bimetallic high-speed cutting blade as claimed in claim 1, in which the hardness of the tips is from 1,300 Hv. to 1,550 Hv. and the flexural strength of the tips is from 210 Kg./mm.² to 160 Kg./mm.².

* * * * *